United States Patent
Valerio Parise et al.

(10) Patent No.: US 11,234,090 B2
(45) Date of Patent: Jan. 25, 2022

(54) USING AUDIO VISUAL CORRESPONDENCE FOR SOUND SOURCE IDENTIFICATION

(71) Applicant: Facebook Technologies, LLC, Menlo Park, CA (US)

(72) Inventors: Cesare Valerio Parise, Seattle, WA (US); Jacob Ryan Donley, Kirkland, WA (US); Philip Robinson, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/735,325

(22) Filed: Jan. 6, 2020

(65) Prior Publication Data

US 2021/0211819 A1  Jul. 8, 2021

(51) Int. Cl.
*H04R 1/32* (2006.01)
*G06T 19/00* (2011.01)
*H04R 29/00* (2006.01)
*H04R 3/12* (2006.01)

(52) U.S. Cl.
CPC ......... *H04R 29/008* (2013.01); *G06T 19/006* (2013.01); *H04R 1/323* (2013.01); *H04R 3/12* (2013.01); *H04R 2201/401* (2013.01)

(58) Field of Classification Search
None
See application file for complete search history.

(56) References Cited

U.S. PATENT DOCUMENTS

| | | | |
|---|---|---|---|
| 2003/0103647 A1* | 6/2003 | Rui | G06T 7/251 382/103 |
| 2006/0075422 A1* | 4/2006 | Choi | G01S 3/7864 725/18 |
| 2013/0083173 A1 | 4/2013 | Geisner et al. | |
| 2016/0065791 A1* | 3/2016 | Li | H04N 5/04 348/515 |
| 2017/0019744 A1* | 1/2017 | Matsumoto | H04R 3/005 |
| 2017/0098453 A1* | 4/2017 | Wright | H04N 7/147 |
| 2017/0153866 A1 | 6/2017 | Grinberg et al. | |
| 2017/0230760 A1 | 8/2017 | Sanger et al. | |
| 2017/0366896 A1* | 12/2017 | Adsumilli | G11B 27/10 |
| 2020/0213737 A1* | 7/2020 | Won | H04R 3/12 |
| 2020/0412772 A1* | 12/2020 | Nesta | G06K 9/00228 |

* cited by examiner

*Primary Examiner* — James K Mooney
(74) *Attorney, Agent, or Firm* — Fenwick & West LLP

(57) ABSTRACT

An audio-video correspondence system performs a correspondence analysis between audio and video content. The system obtains video content that includes audio content, the video content comprising a plurality of frames. The system identifies a first set of pixels within the video content associated with changes in pixel values over a first set of frames of the video content. The system subsequently identifies, from the audio content, first audio associated with the first set of frames corresponding to changes in pixel values of the first set of pixels. The system finally assigns the first audio over the first set of frames to the first set of pixels.

20 Claims, 8 Drawing Sheets

USING AUDIO VISUAL CORRESPONDENCE FOR SOUND SOURCE IDENTIFICATION

BACKGROUND

The present disclosure generally relates to audio systems, and specifically relates to an audio-visual system that uses audio visual correspondence for sound source identification.

Humans are able to determine the location of a sound source by unconsciously comparing the sound perceived at each ear. The sound perceived at the ears of two users can be different, depending on a direction and a location of a sound source with respect to each user as well as on the surroundings of a room in which the sound is perceived. Accordingly, an augmented reality (AR) or a virtual reality (VR) headset simulating an augmented/virtual reality can provide users with spatialized audio so that the direction of the audio output matches the location of the sound source in the AR/VR environment.

SUMMARY

A method using correspondence analysis to determine a correspondence between video and audio content is disclosed. The method obtains video content that includes audio content and identifies a set of pixels within the video content that are associated with changes in pixel values (e.g., B/W, RGB, RGBD, etc.) over a set of frames of the video content. From the audio content, audio corresponding to the set of frames of the video content that correspond to the changes in pixel values of the first set of pixels. The method assigns the first audio over the first set of frames to the first set of pixels.

A system includes a camera to capture the video content, an audio system to capture the audio content, and a controller. The controller is configured to perform the correspondence analysis between the video and audio content. The controller is configured to identify a set of pixels within the video content associated with changes in pixel values over a set of frames of the video content. The controller is further configured to identify, from the audio content, audio associated with the set of frames of the video content that correspond to the changes in pixel values of the set of pixels. Then, the controller assigns the audio over the set of frames to a location in the frame associated with the set of pixels.

Figure 1:
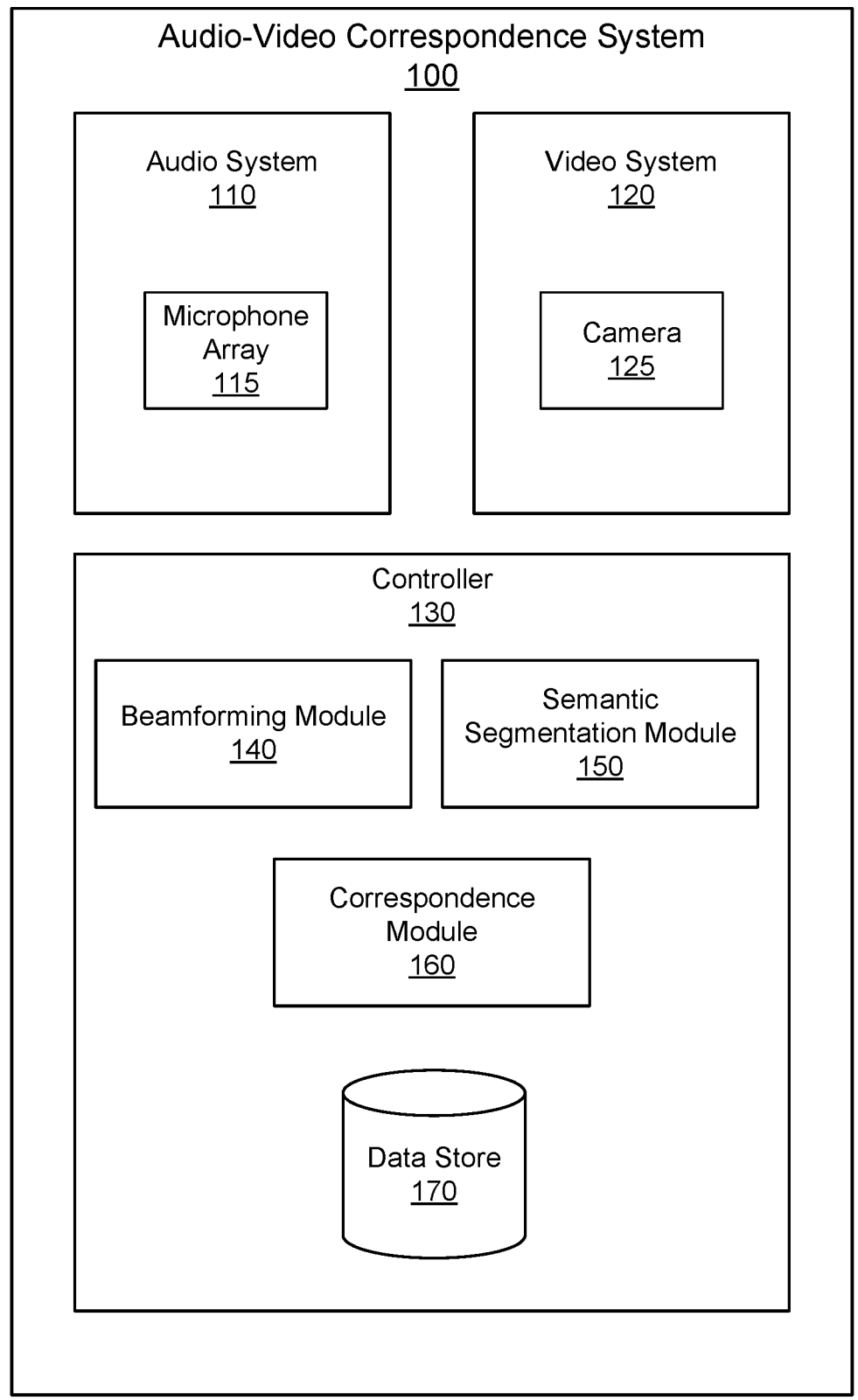
FIG. 1 is a block diagram of an example audio-video correspondence system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Sound sources can be localized using signal processing techniques based on directional information in sound fields captured by spatially separated microphones. Visual content, when available, may also provide information for sound localization. In some instances, visual information may even provide higher-resolution data for sound source localization. For that, however, a correspondence problem between the audio and the visual information is reconciled by determining which pixels, if any, provide relevant information for sound source localization. Accordingly, the described method solves the sound source localization problem using a biologically-inspired solution based on a current understanding of the computational mechanisms of human multisensory integration. Before combining acoustic and visual information, humans need to figure out whether or not visual and acoustic signals are generated by the same underlying physical objects or events (and whether or not those events are redundant). The disclosed method identifies a correspondence between captured video content and captured audio content by analyzing pixels of frames of the video content. For example, the method identifies a set of pixels within the video content with changes in values over a set of frames of the video content. The method also identifies portions of the audio (e.g., a presence of sound, loudness, etc.) associated with the set of frames of the video. Accordingly, the method performs a correspondence analysis which leads to an assigning of the audio to the first set of pixels within the video content.

The changes in pixel values may be indicated by changes in brightness, intensity, or colors. The method may further include an instance segmentation step that identifies different objects within the video content. Accordingly, responsive to identifying a set of pixels as a subset of an object, the method assigns the audio to the object.

The audio-video correspondence may be used to present spatialized audio to a user wearing an AR/VR headset. Audio content presented to the user may appear to originate from portions of the video content that visually depict and/or are associated with sound sources of the audio content. In some embodiments, audio-video correspondence may be useful in transcribing video content. The system may use audio-video correspondence with automatic speech recognition to transcribe audio in the video content, while attributing the audio to entities and/or objects within the video content. The system may be used to automatically subtitle video content incorporating descriptions of the sound sources and the audio they produce. For example, the system may subtitle video content including a conversation between two people on a street to include automatic transcriptions of the conversation, attributing a portion of the conversation to each person, and indicate any sounds produced by vehicles passing by.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Sound Source Identification System

Figure 2A:
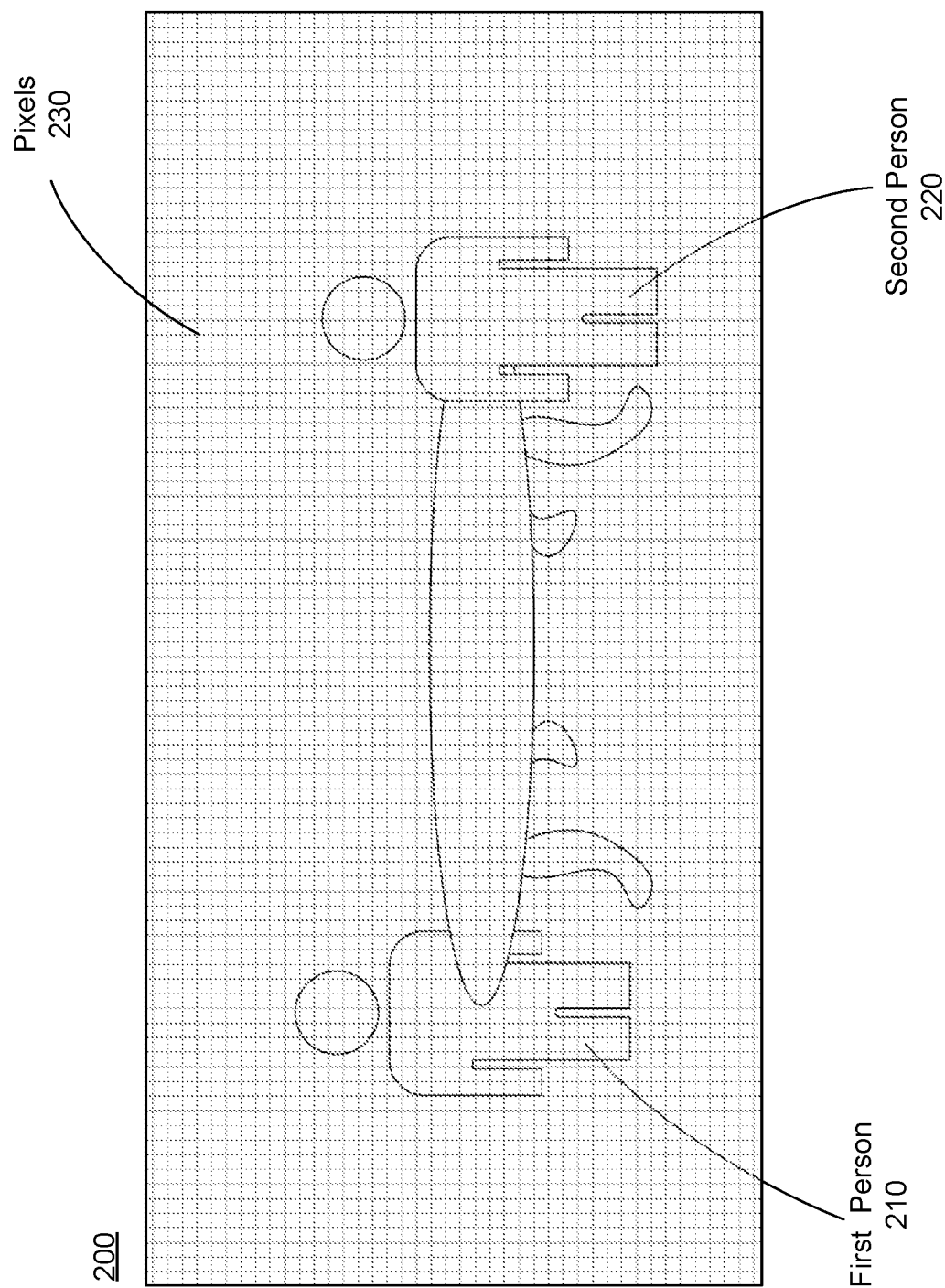
FIG. 2A shows an example of video of two users in a room, in accordance with one or more embodiments.
Figure 2B:
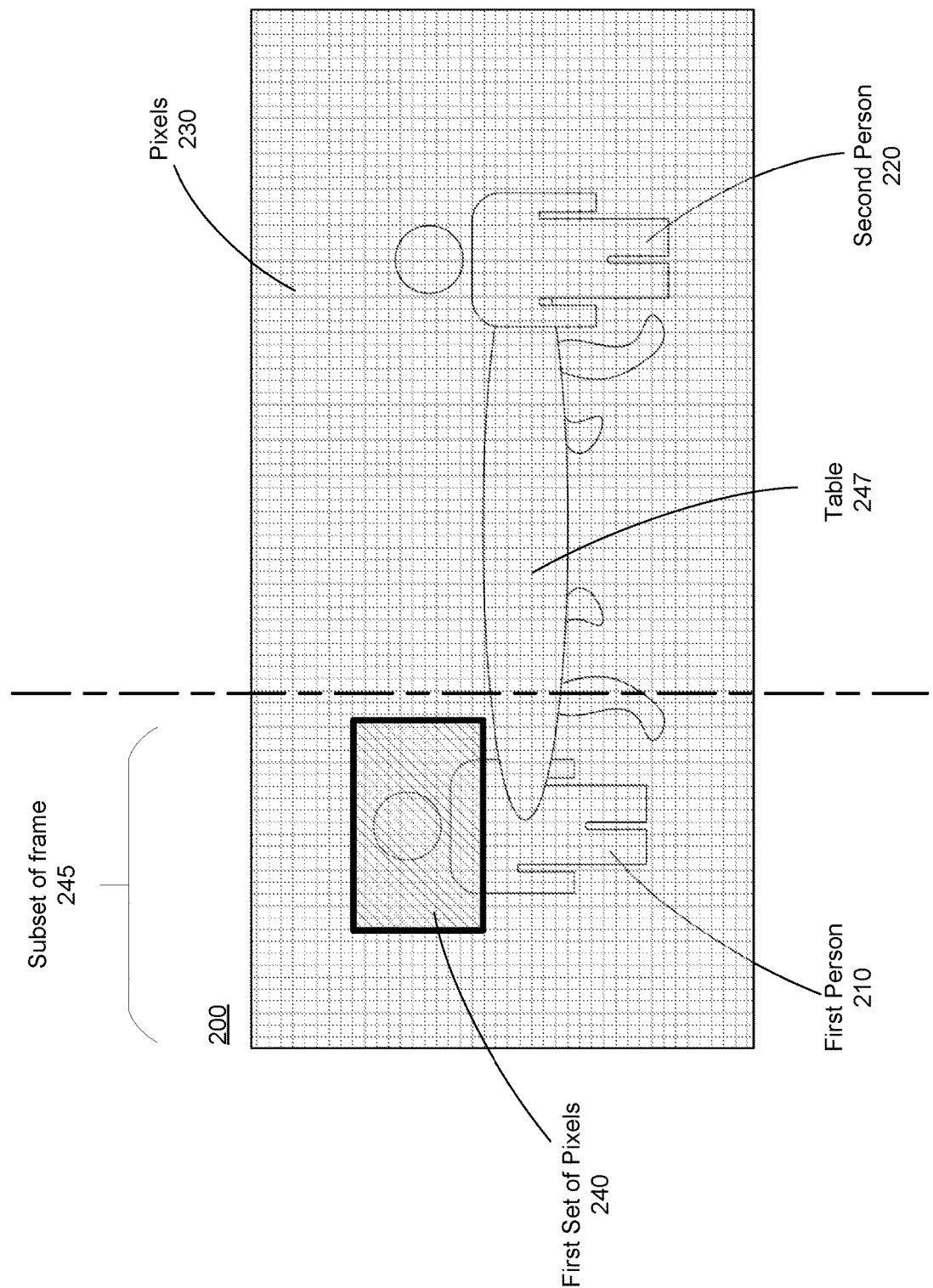
FIG. 2B shows the video of FIG. 2A where a first set of pixels with changes in pixel values have been correlated to audio, in accordance with one or more embodiments.
Figure 2C:
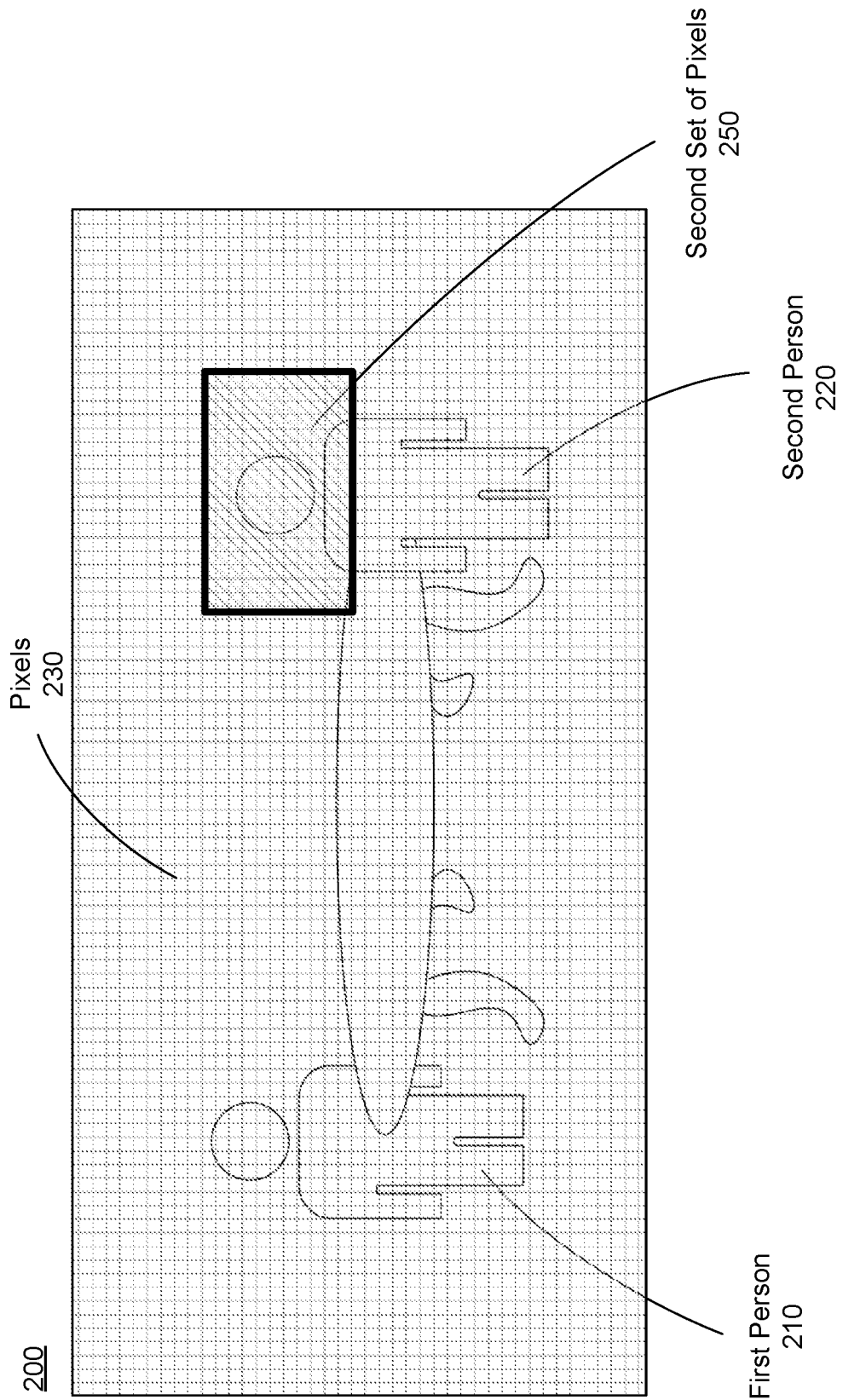
FIG. 2C shows the video of FIGS. 2A and 2B where a second set of pixels with changes in pixel values have been correlated to audio, in accordance with one or more embodiments.

FIG. 1 is a block diagram of an example audio-video correspondence system 100, in accordance with one or more embodiments. The audio-video correspondence system 100 performs a correspondence analysis between captured video content and audio content. The audio-video correspondence system 100 includes an audio system 110, a video system 120, and a controller 130. The audio-video correspondence systems described in FIGS. 2A-C is an embodiment of the audio-video correspondence system 100. Some embodiments of the audio-video correspondence system 100 include other components than those described herein. Similarly, the functions of the components may be distributed differently than described here.

The audio system 110 captures audio content of an environment. The audio system 110 includes a microphone array 115. The microphone array 115 comprises one or more microphones configured to detect audio content within the environment. The audio content may include audio originating from one or more sound sources within the environment. Examples of sound sources include people, animals, automobiles, and so on. In some embodiments, the microphone array 115 converts the detected audio content into an electric format (analog or digital), which it then sends to the controller 130. In some embodiments, the audio system 110 includes sensors beyond microphones, the sensors configured to detect acoustic pressure waves. For example, the audio system 110 may include vibration sensors, accelerometers, or any combination thereof.

In some embodiments, the audio system 110 is configured to identify one or more sound sources responsible for at least a portion of the audio content, and may do so via sound filtering and beamforming techniques. The audio system 110 may filter the captured audio content to identify the one or more sound sources. Sound filters may amplify and/or augment acoustic pressure waves of the audio content that correspond to certain sound sources. The sound filters may target specific sound frequency ranges, via low pass filters, high pass filters, and band pass filters. For example, the audio system 110 may amplify audio that falls within a frequency range of the human voice, when identifying human sound sources.

The audio system 110 is configured to perform audio beamforming to estimate a direction of arrival of the audio, via the microphone array 115. In some embodiments, the microphone array 115 may comprise a plurality of spatially separated microphones to facilitate beamforming. The audio system 110 may use the beamformed signals to spatially filter detected audio content from the environment. The audio system 110 may work with the video system 120 to perform video tracking, computer vision, or any combination thereof, to identify and positionally track the one or more sound sources. In some embodiments, the audio system 110 works with the controller 130 to identify a subset of the video content associated with portions of the audio content to narrow the portion of the video content on which to perform the correspondence analysis. Narrowing the portion of the video content (e.g., one or more frames of video, etc.) and only performing the correspondence analysis on that portion (instead of the whole frame of video content) can save processing time and resources.

The video system 120 captures video content of environment. The video system 120 includes a camera 125 that captures the video content. The video content includes the audio content captured by the audio system 110. The video content includes many frames of video and each frame includes many pixels. The captured video content may be ego-centric, panoramic, spherical, or some combination thereof. In some embodiments, the video system 120 includes other spatial imaging devices such as sonar detectors, ultrasound detectors, and radar detectors, among others. The video system 120 provides the video content to the controller 130 for processing, such as semantic segmentation, and audio-visual correspondence.

The controller 130 controls the operations of the audio system 110 and the video system 120. The controller 130 assigns portions of the audio content to a corresponding set of pixels of the video content. In some embodiments, the controller 130 generates a correspondence map correlating the audio content and the video content for one or more frames of the video content. The controller 130 includes a beamforming module 140, a semantic segmentation module 150, a correspondence module 160, and a datastore 170. Some embodiments of the controller 130 have different components than those described here. Similarly, functions can be distributed among the components in different manners than described here.

The beamforming module 140 is configured to process the audio content captured by the audio system 110 and selectively emphasize sounds within a certain area while deemphasizing sounds from other areas. In analyzing sounds captured by the microphone array 115, the beamforming module 140 may combine information from different acoustic sensors to emphasize sound associated from a particular region of the local area while deemphasizing sound that is from outside of the region. The beamforming module 140 may isolate an audio signal associated with sound from a particular sound source from other sound sources in the local area based on, e.g., different direction of arrival (DOA) estimates. The beamforming module 140 may thus selectively analyze discrete sound sources in the local area. In some embodiments, the beamforming module 140 may enhance audio content from a sound source, and present the audio content to the sound classification module 150 for classification. For example, the beamforming module 140 may apply sound filters which eliminate signals above, below, or between certain frequencies. Signal enhancement acts to enhance sounds associated with a given sound source relative to other sounds detected by the microphone array 115. For example, the beamforming module 140 may apply sound filters to identify human sound sources within the audio content captured of the environment. The audio system 110 may further use the beamformed signals and DOA analysis to estimate acoustic energy coming from different spatial locations and subsequently determine localization estimates of the captured audio content. Beamforming and DOA analysis are further described in detail in U.S. patent application Ser. No. 16/379,450 filed on Apr. 9, 2019 and Ser. No. 16/016,156 filed on Jun. 22, 2018, incorporated herein by reference in their entirety.

In some embodiments, the beamforming module 140 facilitates the correspondence analysis between the video and audio content to reduce necessary computational power. For example, the beamforming module 140 may provide beamforming data to the correspondence module 160, indicating a subset of a set of frames of the video content to include in the correspondence analysis. The use of beamforming in correspondence analysis is further described with respect to FIG. 2B.

In some embodiments, audio-video correspondence system 100 performs sound classification to identify sound sources of the beamformed audio content. For example, the audio-video correspondence system 100 may identify one or more sound sources within the audio content by classifying the beamformed audio content that has been processed by the beamforming module 140. In some embodiments, the audio-video correspondence system 100 identifies sound sources based on a number of acoustic parameters of the beamformed audio content. The acoustic parameters may include a frequency, a rate of sound activation, a rate of frequency modulation, and/or a rate of amplitude modulation. Accordingly, the audio-video correspondence system 100 identifies a plurality of sound sources within an environment. In some embodiments, based on the acoustic parameters, audio-video correspondence system 100 distinguishes between a plurality of sound sources of a similar type. For example, after analyzing audio content of two people having a conversation, the audio-video correspondence system 100 may attribute portions of the audio content to each speaker, thereby distinguishing between the people in the audio content. In some embodiments, the audio-video correspondence system 100 identifies sound sources when pre-processing audio content, prior to performing the audio-video correspondence analysis. As described above, this allows the audio-video correspondence system 100 to narrow the scope of the correspondence analysis to those areas of a frame (or set of frames) that are identified instead of performing the correspondence analysis over the whole of each frame.

The semantic segmentation module 150 semantically segments the video captured by the video system 120. The semantic segmentation of the captured video results in identified objects (e.g., people, furniture, cars, etc.) within the video content. In some embodiments, the semantic segmentation module 150 identifies objects of at least one of the sound sources identified by the controller 130. The semantic segmentation module 150 works with the correspondence module 160 to assign portions of the audio content to locations within the video content (i.e., a set of pixels) that are associated with an identified object.

The correspondence module 160 determines a correspondence between the video content and the audio content via a correspondence analysis. The correspondence module 160 identifies a set of pixels within the video content with changes in pixel values. The changes in pixel values occur over a set of frames of the video content. The changes in pixel values may be changes in colors of the pixels, brightness, hue, luminance, and saturation among others. For example, the plurality of pixels may experience changes in red green blue (RGB) values, black and white values, RGB and depth (RGB D) values, brightness, or some combination thereof. The correspondence module 160 then identifies, from the captured audio content, a portion of audio associated with the identified set of frames of the video content. For example, the set of frames may show a single car traveling from one end of a street to another end. The correspondence module 160 identifies audio (i.e., sounds of a car) associated with the frames showing the car traveling across the street. In one embodiment, correspondence module 160 identifies changes in the pixel values that correlate with audio loudness. The correspondence module 160 then assigns the audio over the set of frames to the first set of pixels.

The correspondence module 160 may identify audio associated with the set of frames corresponding to the set of pixels with changing values by evaluating the acoustic properties of the audio content. The acoustic properties may include, for example, a frequency range, a modulation of frequency, average frequency, acoustic resonance, spectral peaks, a loudness, and an envelope. The correspondence module 160 may determine that the acoustic properties correspond with the changes in pixel values of the set of pixels.

In one embodiment, the correspondence module 160 bases the correspondence on the semantic segmentation module 150's identification of objects within the captured video content. For example, the semantic segmentation module 150 may identify a set of pixels within the video content as associated with a person. The correspondence module 160 assigns the audio corresponding to human speech to the set of pixels identified as the person.

The data store 170 stores data for use by the audio-video correspondence system 100. Data in the data store 170 may include the captured video and audio content, one or more object groups determined by semantic segmentation of the video content, acoustic properties of the object groups, thresholds of changing pixel values, temporal data associated with the video and audio content, sound filters, other data relevant for use by the audio-video correspondence system 100, or any combination thereof.

Examples of Audio-Video Correspondence

FIG. 2A shows an example of video 200 with two users in a room, in accordance with one or more embodiments. The video 200 is displayed via a plurality of pixels 230 and includes visual representations of two users (i.e., sound sources) that, in this example, are a first person 210 and a second person 220 having a conversation. Thus, the audio of video 200 is that of the first person 210 and the second person 220 having a conversation. The video 200 may include sounds sources beyond people, such as animals, construction, vehicles driving on a street, or some combination thereof.

FIG. 2B shows the video 200 where a first set of pixels 240 with changes in pixels corresponding to audio in the video 200 has been identified, in accordance with one or more embodiments. Accordingly, in this example, the audio-video correspondence system 100 determines a correspondence between the video 200 and corresponding audio. The system 100 identifies a first set of pixels 240 with changes pixel values over a first set of frames. The system subsequently identifies, from the audio of the video 200, a portion of the audio, (i.e., a first audio) associated with the first set of frames (e.g., the first audio as occurring over a period of time associated with the first set of frames). In response to determining a correlation between the changes in pixel values of the first set of pixels 240, the system assigns the first audio occurring over the first set of frames to the first set of pixels 240. For example, the system may identify pixels with changing values, i.e., a first set of pixels, over a set of 5 frames. The changing pixel values may correspond to movement of the mouth of the first person 210, captured over the 5 frames. The system then identifies audio captured over the 5 frames to identify first audio that is associated with the speech of the first person 210. The first audio, captured over the set of 5 frames is assigned to the first set of pixels.

In one embodiment, the system 100 uses audio beamforming (or similar direction or arrival methods) to help narrow the portion of each frame over which to perform the correspondence analysis. For example, beamforming can be used to highlight a general area in the video content from which the sound in the video is originating. Then, the system 100 can perform the correspondence analysis over a smaller number of pixels to more accurately identify the location of the audio's origination. Accordingly, FIG. 2B shows a portion of the pixels 200 that correspond to a subset of frame 245 for each frame in the first set of frames. The system may only perform the correspondence analysis on the subset of the frame 245, rather than performing the correspondence analysis on all of the pixels 230, thus reducing the required processing power and compute time.

In some embodiments, the system uses semantic segmentation to assign the first audio to an object in the video. After determining a correspondence between the video 200 and corresponding audio, the system may assign the first audio to an object determined by semantic segmentation. In this example, the first set of pixels are a subset of pixels identified as a particular object (e.g., first person 210). Semantic segmentation is the process of assigning a label to each pixel in an image. For example, the system 100 processes the video 200 to determine objects in the video that belong to the same pixel groupings. For example, the controller may semantically segment the video 200 to identify the objects of people, corresponding to the first person 210 and the second person 220, and furniture, corresponding to the table 247. At least one machine learning based model may be used to semantically segment the video 200 and identify the first person 210 and the second person 220 as people. Accordingly, in FIG. 2B, the system assigns the first audio to the first person 210.

FIG. 2C shows the video of FIGS. 2A and 2B where a second set of pixels 250 with changes in pixel values have been correlated to audio, in accordance with one or more embodiments. In this embodiment, the audio-video correspondence system uses correspondence analysis to identify second audio corresponding to the second set of pixels 250. The correspondence analysis performed is substantially similar to those described with respect to FIG. 2B, but performed over a different set of frames. The system identifies the second set of pixels 250 within the video 200 as associated with changes in values over a second set of frames. The system also identifies second audio of the captured audio corresponding to the video 200, that corresponds to the second set of frames. In response to determining a correlation between the changes in pixel values of the second set of pixels 250, the system 100 assigns the second audio to the second set of pixels 250. As described with respect to FIG. 2B, audio beamforming can also be used to identify a subset of each frame of the second set of frames to narrow the number of pixels to analyze in the correspondence analysis.

The audio-video correspondence system generates a correspondence map that maps audio to sets of pixels within a set of frames. For example, the correspondence map may indicate that the first set of pixels 240 corresponds to the first audio over one or more frames where the first person 210 is speaking. Similarly, the correspondence map indicates the second set of pixels 250 corresponds to the second audio over one or more frames where the second person 220 is speaking. In some embodiments, a user of the audio-video correspondence system may query and/or contribute to the correspondence map.

A Method for Audio-Video Correspondence

Figure 3:
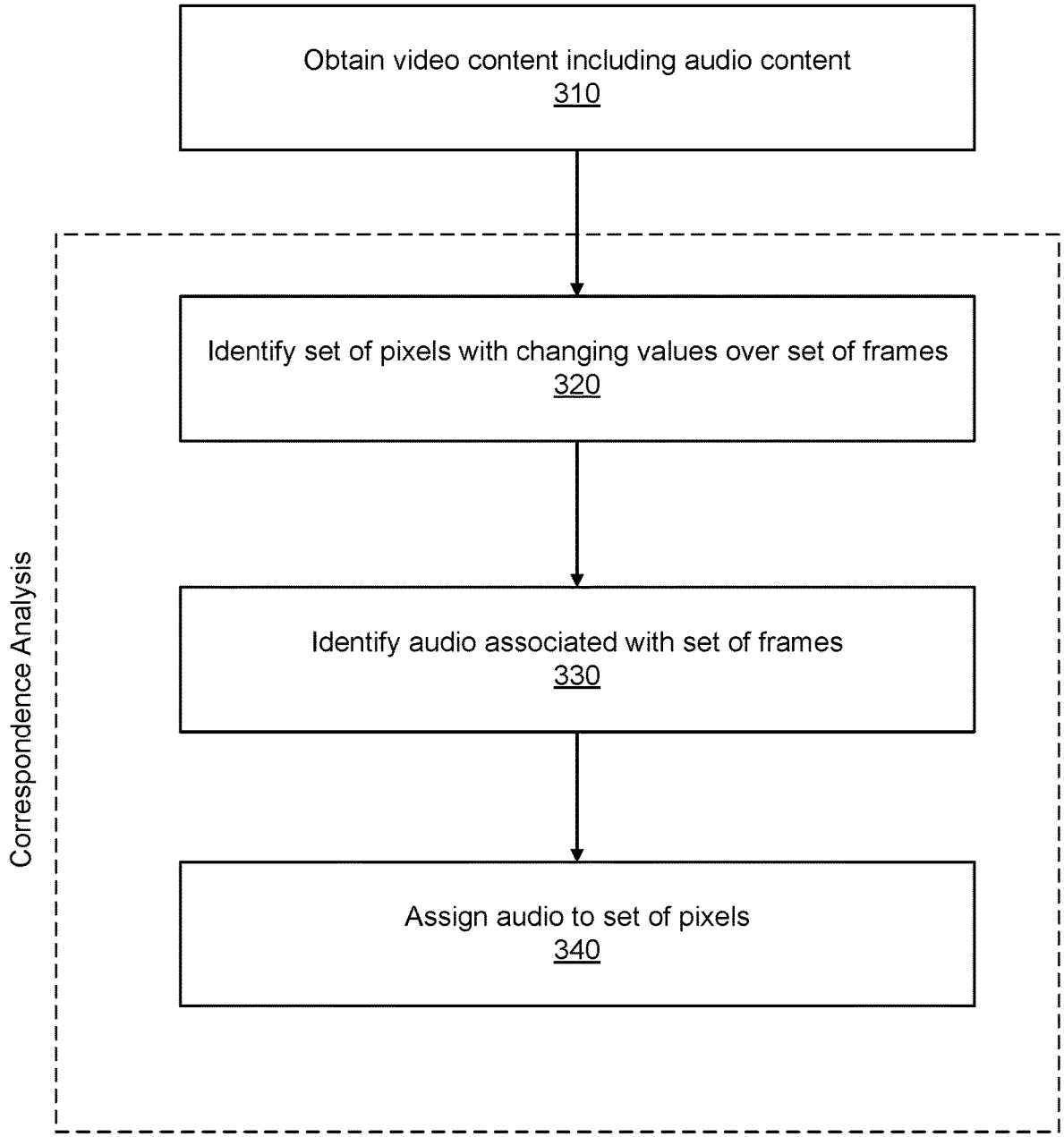
FIG. 3 is a process for performing audio-video correspondence, in accordance with one or more embodiments.

FIG. 3 is a process 300 for performing audio-video correspondence, in accordance with one or more embodiments. An audio-video correspondence system (e.g., the audio-video correspondence system 100) performs the process 300. In some embodiments, the process 300 may be performed by components of an apparatus, such as a headset. Other entities may perform some or all of the steps of the process in other embodiments. For example, in one embodiment, the headset may include an audio system that performs audio processing functions, such as the audio system 110 of FIG. 1, but no video system for performing video processing functions. Likewise, embodiments may include different and/or additional steps, or perform the steps in different orders.

The audio-video correspondence system obtains 310 video content that includes audio content. As described above, with respect to FIGS. 1-2, the audio content may originate within an environment from entities and/or objects, such as people. The video content is represented by a plurality of pixels.

The audio-video correspondence system identifies 320 a set of pixels with changing values over a set of frames. The pixel values monitored for change include brightness, color, and depth, among others. In some embodiments, the system relies on direction of arrival estimations, determined via beamforming, to identify a portion of the frames to monitor for changes in pixel values. In some embodiments, the system performs pre-processing on the audio content to classify sound sources included in the audio and/or manipulate audio associated with a sound source. For example, the system may amplify portions of the audio content that correspond to a designated sound source, while attenuating the remaining portions of the audio content.

The audio-correspondence system identifies 330 audio associated with the set of frames over which the set of pixels with changing values was identified. In one embodiment, changes in pixel values are correlated to sound magnitude, intensity, loudness, or other sound characteristics. In one embodiment, the audio-correspondence system correlates pixel value change frequency with the frequency of the audio as indicative that this particular set of pixels is likely making sound with this sound characteristic.

The audio-correspondence system assigns 340 the audio captured over the set of frames to the set of pixels. In some embodiments, the system identifies, using semantic segmentation, the set of pixels as associated with an object. In particular, if semantic segmentation returns an object that includes a set of pixels and a subset of those pixels are the pixels identified by the system with changes in pixel values, the system assigns the audio to that object. For example, the object could be a person and the subset of those pixels could correspond to the person's mouth as they are talking.

Accordingly, the system assigns the audio to the object corresponding to the set of pixels.

The audio-correspondence system may generate a correspondence map that tracks the correspondence of the video and audio content across frames of the video content. A user may access and/or contribute to the correspondence map.

Artificial Reality/Virtual Reality Headset

In some embodiments, the audio-correspondence system 100 described in FIG. 1 may be coupled to an artificial reality (AR) and/or virtual reality (VR) headset. The functions of the audio-correspondence system 100 may be done in part or in entirety by the AR/VR headset. The AR/VR headset may perform more than audio-correspondence analysis. For example, the AR/VR headset may provide spatialized audio and video content to a user of the headset using the audio-visual correspondence done by the audio-correspondence system 100.

Figure 4A:
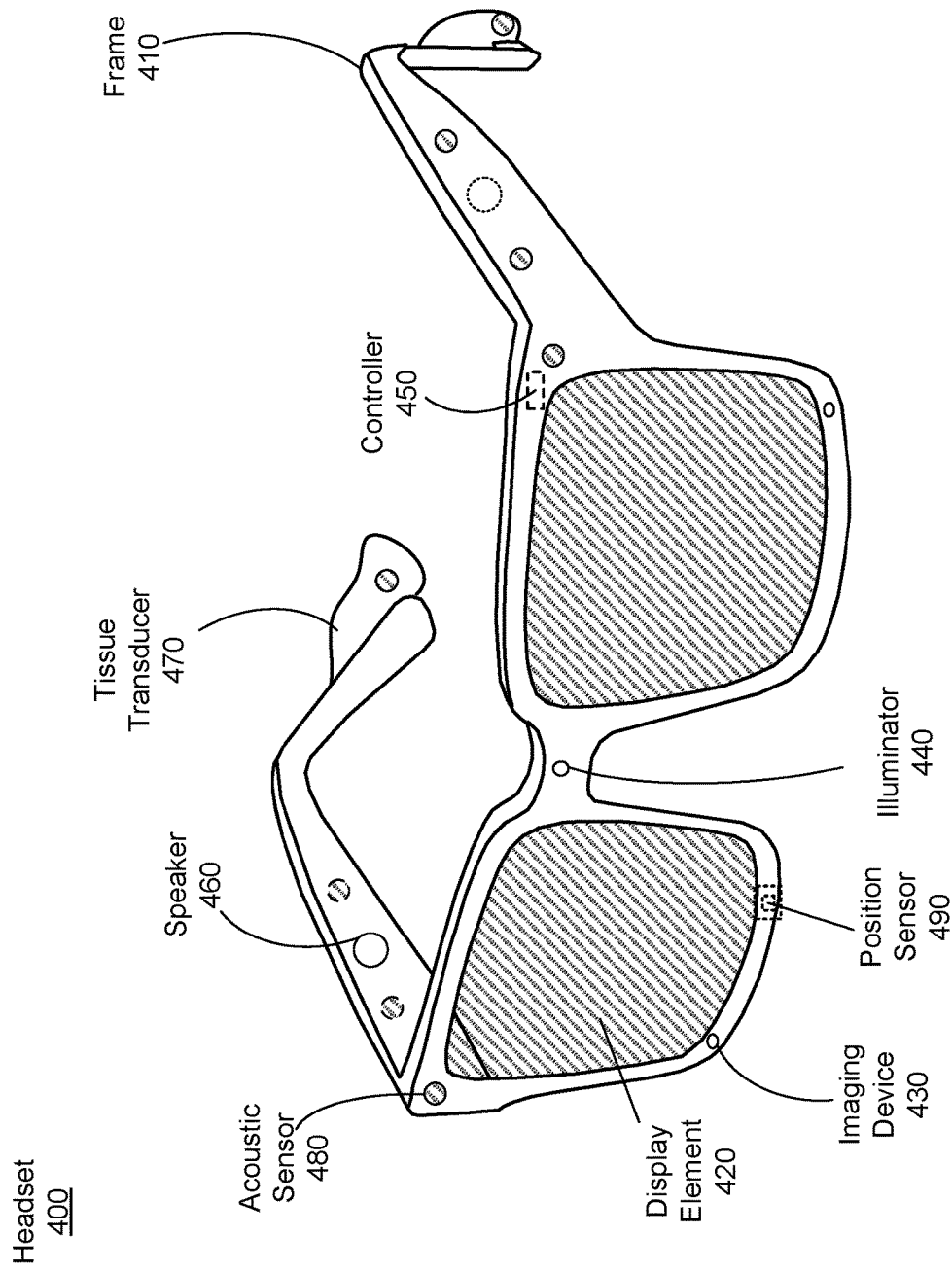
FIG. 4A is a perspective view of a headset implemented as an eyewear device, in accordance with one or more embodiments.

FIG. 4A is a perspective view of a headset 400 implemented as an eyewear device, in accordance with one or more embodiments. In some embodiments, the eyewear device is a near eye display (NED). In general, the headset 400 may be worn on the face of a user such that content (e.g., media content) is presented using a display assembly and/or an audio system. However, the headset 400 may also be used such that media content is presented to a user in a different manner. Examples of media content presented by the headset 400 include one or more images, video, audio, or some combination thereof. The headset 400 includes a frame, and may include, among other components, a display assembly including one or more display elements 420, a depth camera assembly (DCA), an audio system, a controller 450, and a position sensor 490. The audio system 110 of FIG. 1 may be an embodiment of the audio system of the headset 400, the video system 120 an embodiment of the DCA, and the controller 130 an embodiment of the controller 450. While FIG. 4A illustrates the components of the headset 400 in example locations on the headset 400, the components may be located elsewhere on the headset 400, on a peripheral device paired with the headset 400, or some combination thereof. Similarly, there may be more or fewer components on the headset 400 than what is shown in FIG. 4A.

The frame 410 holds the other components of the headset 400. The frame 410 includes a front part that holds the one or more display elements 420 and end pieces (e.g., temples) to attach to a head of the user. The front part of the frame 410 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 420 provide light to a user wearing the headset 400. As illustrated the headset includes a display element 420 for each eye of a user. In some embodiments, a display element 420 generates image light that is provided to an eyebox of the headset 400. The eyebox is a location in space that an eye of user occupies while wearing the headset 400. For example, a display element 420 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 400. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 420 are opaque and do not transmit light from a local area around the headset 400. The local area is the area surrounding the headset 400. For example, the local area may be a room that a user wearing the headset 400 is inside, or the user wearing the headset 400 may be outside and the local area is an outside area. In this context, the headset 400 generates VR content. Alternatively, in some embodiments, one or both of the display elements 420 are at least partially transparent, such that light from the local area may be combined with light from the one or more display elements to produce AR and/or MR content.

In some embodiments, a display element 420 does not generate image light, and instead is a lens that transmits light from the local area to the eyebox. For example, one or both of the display elements 420 may be a lens without correction (non-prescription) or a prescription lens (e.g., single vision, bifocal and trifocal, or progressive) to help correct for defects in a user's eyesight. In some embodiments, the display element 420 may be polarized and/or tinted to protect the user's eyes from the sun.

Note that in some embodiments, the display element 420 may include an additional optics block (not shown). The optics block may include one or more optical elements (e.g., lens, Fresnel lens, etc.) that direct light from the display element 420 to the eyebox. The optics block may, e.g., correct for aberrations in some or all of the image content, magnify some or all of the image, or some combination thereof.

The DCA determines depth information for a portion of a local area surrounding the headset 400. The DCA includes one or more imaging devices 430 and a DCA controller (not shown in FIG. 4A), and may also include an illuminator 440. In some embodiments, the illuminator 440 illuminates a portion of the local area with light. The light may be, e.g., structured light (e.g., dot pattern, bars, etc.) in the infrared (IR), IR flash for time-of-flight, etc. In some embodiments, the one or more imaging devices 430 capture images of the portion of the local area that include the light from the illuminator 440. As illustrated, FIG. 4A shows a single illuminator 440 and two imaging devices 430. In alternate embodiments, there is no illuminator 440 and at least two imaging devices 430.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 440), some other technique to determine depth of a scene, or some combination thereof.

The DCA may be function as and/or be a component of the video system 120 of the audio-correspondence system 100. The DCA may provide the captured video content to the controller 450 to semantically segment captured video content and facilitate audio-visual correspondence for sound source identification.

The audio system provides audio content. The audio system includes a transducer array, and a sensor array. However, in other embodiments, the audio system may include different and/or additional components. Similarly, in some cases, functionality described with reference to the components of the audio system can be distributed among the components in a different manner than is described here.

For example, some or all of the functions of the controller may be performed by a remote server.

The transducer array presents sound to user. The transducer array includes a plurality of transducers. A transducer may be a speaker 460 or a tissue transducer 470 (e.g., a bone conduction transducer or a cartilage conduction transducer). Although the speakers 460 are shown exterior to the frame 410, the speakers 460 may be enclosed in the frame 410. In some embodiments, instead of individual speakers for each ear, the headset 400 includes a speaker array comprising multiple speakers integrated into the frame 410 to improve directionality of presented audio content. The tissue transducer 470 couples to the head of the user and directly vibrates tissue (e.g., bone or cartilage) of the user to generate sound. The number and/or locations of transducers may be different from what is shown in FIG. 4A.

The sensor array detects sounds within the local area of the headset 400. The sensor array includes a plurality of acoustic sensors 480. An acoustic sensor 480 captures sounds emitted from one or more sound sources in the local area (e.g., a room). Each acoustic sensor is configured to detect sound and convert the detected sound into an electronic format (analog or digital). The acoustic sensors 480 may be acoustic wave sensors, microphones, sound transducers, or similar sensors that are suitable for detecting sounds.

In some embodiments, one or more acoustic sensors 480 may be placed in an ear canal of each ear (e.g., acting as binaural microphones). In some embodiments, the acoustic sensors 480 may be placed on an exterior surface of the headset 400, placed on an interior surface of the headset 400, separate from the headset 400 (e.g., part of some other device), or some combination thereof. The number and/or locations of acoustic sensors 480 may be different from what is shown in FIG. 4A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 400.

The controller 450 processes information from the sensor array that describes sounds detected by the sensor array. The controller 450 may comprise a processor and a computer-readable storage medium. The controller 450 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 460, or some combination thereof.

In some embodiments, the controller 450 processes video content captured by the DCA. The controller 450 may be an embodiment of the controller 130, described in FIG. 1. Accordingly, the controller 450 may be configured to perform audio-visual correspondence to identify sound sources within video content.

The position sensor 490 generates one or more measurement signals in response to motion of the headset 400. The position sensor 490 may be located on a portion of the frame 410 of the headset 400. The position sensor 490 may include an inertial measurement unit (IMU). Examples of position sensor 490 include: one or more accelerometers, one or more gyroscopes, one or more magnetometers, another suitable type of sensor that detects motion, a type of sensor used for error correction of the IMU, or some combination thereof. The position sensor 490 may be located external to the IMU, internal to the IMU, or some combination thereof.

In some embodiments, the headset 400 may provide for simultaneous localization and mapping (SLAM) for a position of the headset 400 and updating of a model of the local area. For example, the headset 400 may include a passive camera assembly (PCA) that generates color image data. The PCA may include one or more RGB cameras that capture images of some or all of the local area. In some embodiments, some or all of the imaging devices 430 of the DCA may also function as the PCA. The images captured by the PCA and the depth information determined by the DCA may be used to determine parameters of the local area, generate a model of the local area, update a model of the local area, or some combination thereof. Furthermore, the position sensor 490 tracks the position (e.g., location and pose) of the headset 400 within the room.

Figure 4B:
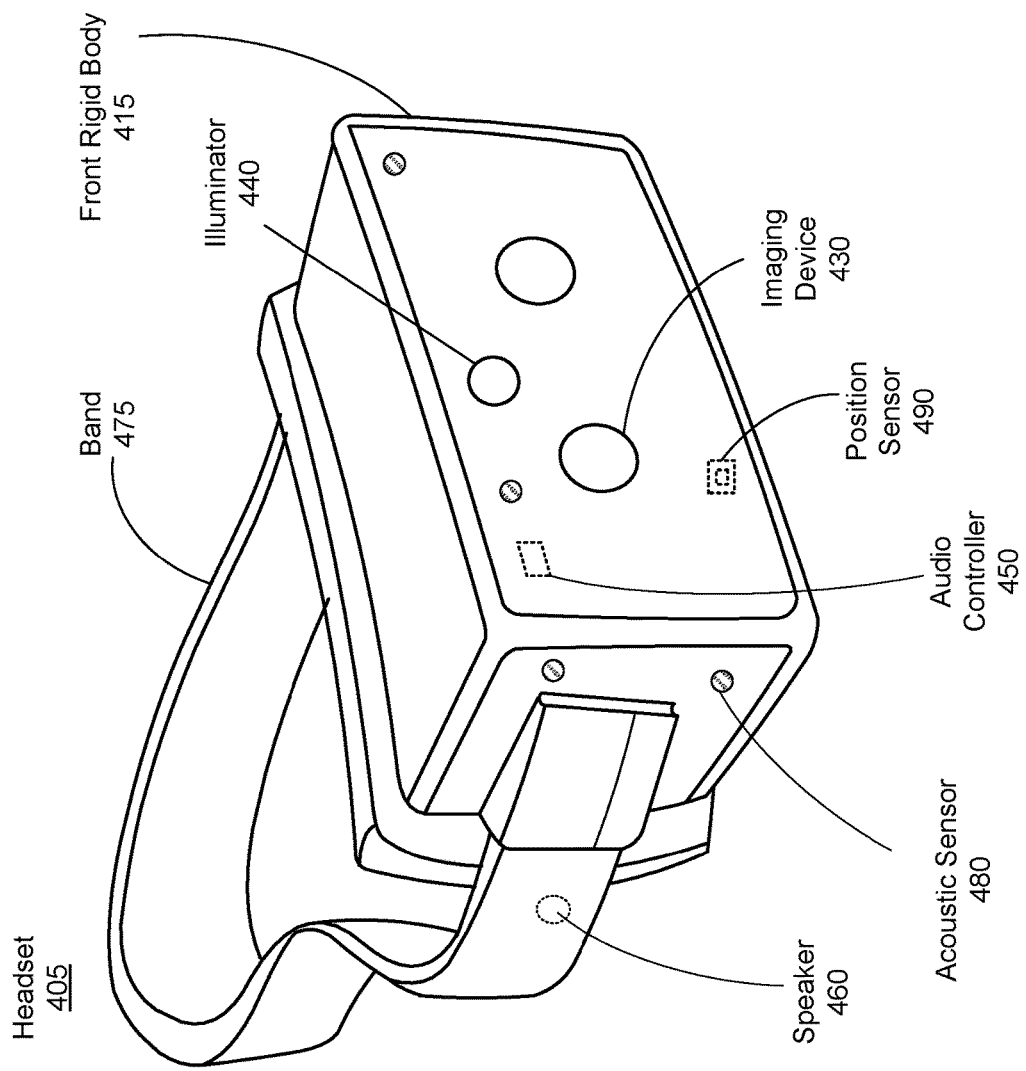
FIG. 4B is a perspective view of a headset implemented as a head-mounted display, in accordance with one or more embodiments.

FIG. 4B is a perspective view of a headset 405 implemented as a head-mounted display, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 415 and a band 475. The headset 405 includes many of the same components described above with reference to FIG. 4A, but modified to integrate with the HMD form factor. For example, the HMD includes a display assembly, a DCA, an audio system, and a position sensor 490. FIG. 4B shows the illuminator 440, a plurality of the speakers 460, a plurality of the imaging devices 430, a plurality of acoustic sensors 480, and the position sensor 490.

Example of an Artificial Reality System

Figure 5:
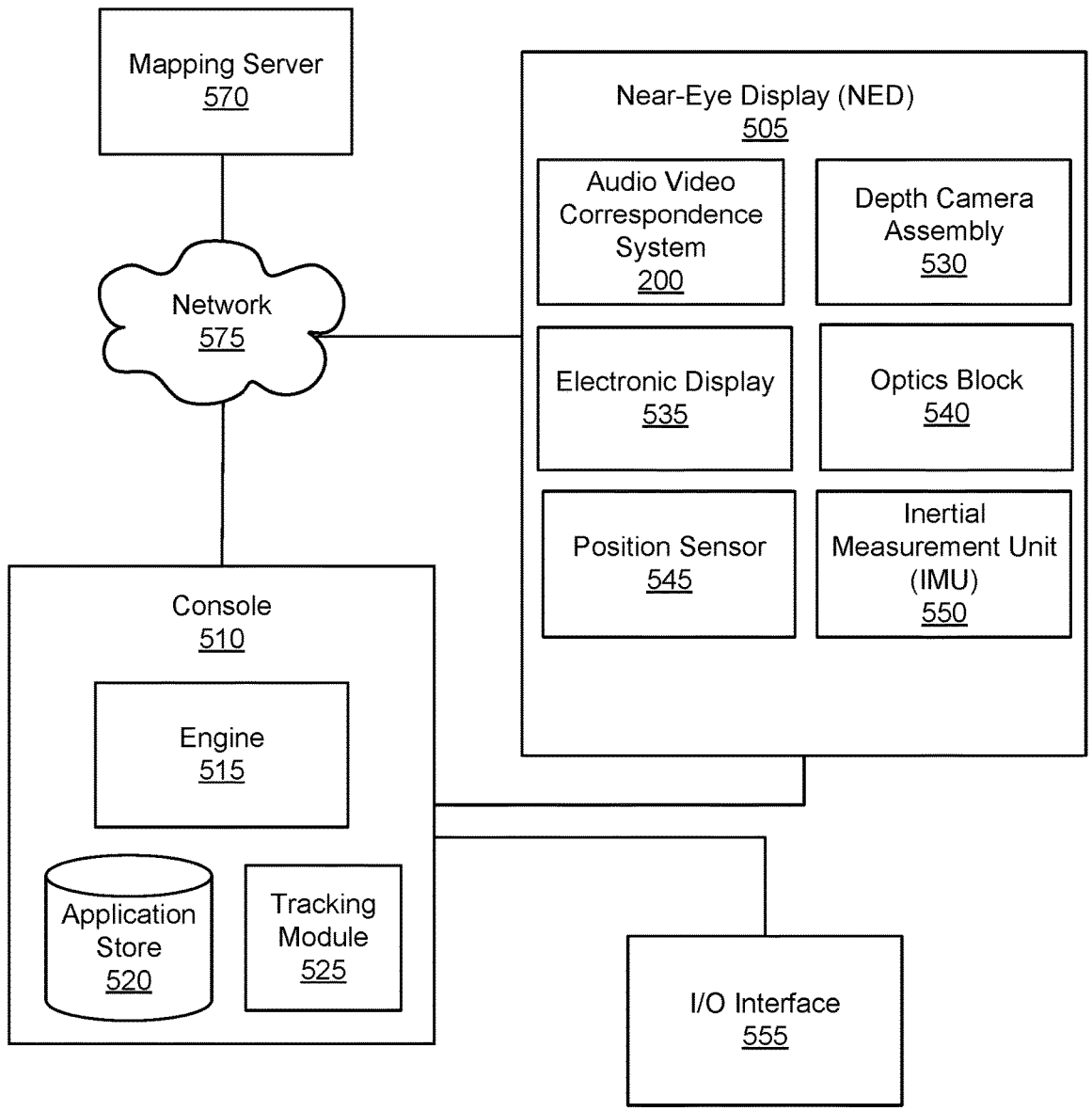
FIG. 5 is a block diagram of an example artificial reality system, in accordance with one or more embodiments.

FIG. 5 is a block diagram of an example artificial reality system 500, in accordance with one or more embodiments. The artificial reality system 500 presents an artificial reality environment to a user, e.g., a virtual reality, an augmented reality, a mixed reality environment, or some combination thereof. The system 500 comprises a near eye display (NED) 505, which may include a headset and/or a head mounted display (HMD), and an input/output (I/O) interface 555, both of which are coupled to a console 510. The system 500 also includes a mapping server 570 which couples to a network 575. The network 575 couples to the NED 505 and the console 510. The NED 505 may be an embodiment of the headset 400. While FIG. 5 shows an example system with one NED, one console, and one I/O interface, in other embodiments, any number of these components may be included in the system 500.

The NED 505 presents content to a user comprising augmented views of a physical, real-world environment with computer-generated elements (e.g., two dimensional (2D) or three dimensional (3D) images, 2D or 3D video, sound, etc.). The NED 505 may be an eyewear device or a head-mounted display. In some embodiments, the presented content includes audio content that is presented via the audio system 300 that receives audio information (e.g., an audio signal) from the NED 505, the console 510, or both, and presents audio content based on the audio information. The NED 505 presents artificial reality content to the user. The NED includes the sound source identification system 300, a depth camera assembly (DCA) 530, an electronic display 535, an optics block 540, one or more position sensors 545, and an inertial measurement unit (IMU) 550. In some embodiments, the NED 505 includes components different from those described here. Additionally, the functionality of various components may be distributed differently than what is described here.

The audio-correspondence system 100 performs audio-video correspondence analysis to determine a correspondence between video content and audio content. The audio system 110 captures the audio content corresponding to the video content captured by the video system 120. The audio system 210 may perform audio beamforming and direction of arrival analysis. The video system 220 captures the video content, represented by pixels. The controller 130 identifies a set of pixels within the video content associated with changes in pixel values over a set of frames and identifies audio corresponding to the set of frames. The controller 130 assigns the set of pixels to the audio.

The DCA 530 captures data describing depth information of a local environment surrounding some or all of the NED 505. The DCA 530 may include a light generator (e.g., structured light and/or a flash for time-of-flight), an imaging device, and a DCA controller that may be coupled to both the light generator and the imaging device. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. The imaging device captures one or more images of one or more objects in the local area illuminated with the illumination light. The DCA 530 can compute the depth information using the data captured by the imaging device or the DCA 530 can send this information to another device such as the console 510 that can determine the depth information using the data from the DCA 530.

In some embodiments, the audio-correspondence system 100 may utilize the depth information obtained from the DCA 530. The audio-correspondence system 100 may use the depth information to identify directions of one or more potential sound sources, depth of one or more sound sources, movement of one or more sound sources, sound activity around one or more sound sources, or any combination thereof.

The electronic display 535 displays 2D or 3D images to the user in accordance with data received from the console 510. In various embodiments, the electronic display 535 comprises a single electronic display or multiple electronic displays (e.g., a display for each eye of a user). Examples of the electronic display 535 include: a liquid crystal display (LCD), an organic light emitting diode (OLED) display, an active-matrix organic light-emitting diode display (AMO-LED), waveguide display, some other display, or some combination thereof. In some embodiments, the electronic display 545 displays the video content captured by the audio-correspondence system 100. When the audio-correspondence system 100 presents audio and video content to the user, the audio content may be spatialized and adjusted as though it were presented in the environment in which the video content was captured.

In some embodiments, the optics block 540 magnifies image light received from the electronic display 535, corrects optical errors associated with the image light, and presents the corrected image light to a user of the NED 505. In various embodiments, the optics block 540 includes one or more optical elements. Example optical elements included in the optics block 540 include: a waveguide, an aperture, a Fresnel lens, a convex lens, a concave lens, a filter, a reflecting surface, or any other suitable optical element that affects image light. Moreover, the optics block 540 may include combinations of different optical elements. In some embodiments, one or more of the optical elements in the optics block 540 may have one or more coatings, such as partially reflective or anti-reflective coatings.

Magnification and focusing of the image light by the optics block 540 allows the electronic display 535 to be physically smaller, weigh less, and consume less power than larger displays. Additionally, magnification may increase the field of view of the content presented by the electronic display 535. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 540 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 535 for display is predistorted, and the optics block 540 corrects the distortion when it receives image light from the electronic display 535 generated based on the content.

The IMU 550 is an electronic device that generates data indicating a position of the headset 505 based on measurement signals received from one or more of the position sensors 545. A position sensor 545 generates one or more measurement signals in response to motion of the headset 505. Examples of position sensors 545 include: one or more accelerometers, one or more gyroscopes, one or more magnetometers, another suitable type of sensor that detects motion, a type of sensor used for error correction of the IMU 550, or some combination thereof. The position sensors 545 may be located external to the IMU 550, internal to the IMU 550, or some combination thereof. In one or more embodiments, the IMU 550 and/or the position sensor 545 may be sensors in the sensor array 420, configured to capture data about the audio content presented by audio system 300.

Based on the one or more measurement signals from one or more position sensors 545, the IMU 550 generates data indicating an estimated current position of the NED 505 relative to an initial position of the NED 505. For example, the position sensors 545 include multiple accelerometers to measure translational motion (forward/back, up/down, left/right) and multiple gyroscopes to measure rotational motion (e.g., pitch, yaw, and roll). In some embodiments, the IMU 550 rapidly samples the measurement signals and calculates the estimated current position of the NED 505 from the sampled data. For example, the IMU 550 integrates the measurement signals received from the accelerometers over time to estimate a velocity vector and integrates the velocity vector over time to determine an estimated current position of a reference point on the NED 505. Alternatively, the IMU 550 provides the sampled measurement signals to the console 510, which interprets the data to reduce error. The reference point is a point that may be used to describe the position of the NED 505. The reference point may generally be defined as a point in space or a position related to the eyewear device's 505 orientation and position.

The I/O interface 555 is a device that allows a user to send action requests and receive responses from the console 510. An action request is a request to perform a particular action. For example, an action request may be an instruction to start or end capture of image or video data, or an instruction to perform a particular action within an application. The I/O interface 555 may include one or more input devices. Example input devices include: a keyboard, a mouse, a hand controller, or any other suitable device for receiving action requests and communicating the action requests to the console 510. An action request received by the I/O interface 555 is communicated to the console 510, which performs an action corresponding to the action request. In some embodiments, the I/O interface 515 includes an IMU 550, as further described above, that captures calibration data indicating an estimated position of the I/O interface 555 relative to an initial position of the I/O interface 555. In some embodiments, the I/O interface 555 may provide haptic feedback to the user in accordance with instructions received from the console 510. For example, haptic feedback is provided when an action request is received, or the console 510 communicates instructions to the I/O interface 555 causing the I/O interface 555 to generate haptic feedback when the console 510 performs an action. The I/O interface 555 may monitor one or more input responses from the user for use in determining a perceived origin direction and/or perceived origin location of audio content.

The console 510 provides content to the NED 505 for processing in accordance with information received from one or more of: the NED 505 and the I/O interface 555. In the example shown in FIG. 5, the console 510 includes an application store 520, a tracking module 525 and an engine 515. Some embodiments of the console 510 have different modules or components than those described in conjunction with FIG. 5. Similarly, the functions further described below may be distributed among components of the console 510 in a different manner than described in conjunction with FIG. 5.

The application store 520 stores one or more applications for execution by the console 510. An application is a group of instructions, that when executed by a processor, generates content for presentation to the user. Content generated by an application may be in response to inputs received from the user via movement of the NED 505 or the I/O interface 555. Examples of applications include: gaming applications, conferencing applications, video playback applications, or other suitable applications.

The tracking module 525 calibrates the system environment 500 using one or more calibration parameters and may adjust one or more calibration parameters to reduce error in determination of the position of the NED 505 or of the I/O interface 555. Calibration performed by the tracking module 525 also accounts for information received from the IMU 550 in the NED 505 and/or an IMU 550 included in the I/O interface 555. Additionally, if tracking of the NED 505 is lost, the tracking module 525 may re-calibrate some or all of the system environment 500.

The tracking module 525 tracks movements of the NED 505 or of the I/O interface 555 using information from the one or more position sensors 545, the IMU 550, the DCA 530, or some combination thereof. For example, the tracking module 525 determines a position of a reference point of the NED 505 in a mapping of a local area based on information from the NED 505. The tracking module 525 may also determine positions of the reference point of the NED 505 or a reference point of the I/O interface 555 using data indicating a position of the NED 505 from the IMU 550 or using data indicating a position of the I/O interface 555 from an IMU 550 included in the I/O interface 555, respectively. Additionally, in some embodiments, the tracking module 525 may use portions of data indicating a position or the headset 505 from the IMU 550 to predict a future position of the NED 505. The tracking module 525 provides the estimated or predicted future position of the NED 505 or the I/O interface 555 to the engine 515. In some embodiments, the tracking module 525 may provide tracking information to the audio system 300 for use in generating the sound filters.

The engine 515 also executes applications within the system environment 500 and receives position information, acceleration information, velocity information, predicted future positions, or some combination thereof, of the NED 505 from the tracking module 525. Based on the received information, the engine 515 determines content to provide to the NED 505 for presentation to the user. For example, if the received information indicates that the user has looked to the left, the engine 515 generates content for the NED 505 that mirrors the user's movement in a virtual environment or in an environment augmenting the local area with additional content. Additionally, the engine 515 performs an action within an application executing on the console 510 in response to an action request received from the I/O interface 555 and provides feedback to the user that the action was performed. The provided feedback may be visual or audible feedback via the NED 505 or haptic feedback via the I/O interface 555.

The mapping server 570 may provide the NED 505 with audio and visual content to present to the user. The mapping server 570 includes a database that stores a virtual model describing a plurality of environments and acoustic properties of those environments. The NED 505 may query the mapping server 570 for the acoustic properties of an environment. The mapping server 570 receives, from the NED 505, via the network 575, visual information describing at least the portion of the environment the user is currently in, such as a room, and/or location information of the NED 505. The mapping server 570 determines, based on the received visual information and/or location information, a location in the virtual model that is associated with the current configuration of the room. The mapping server 570 determines (e.g., retrieves) a set of acoustic parameters associated with the current configuration of the room, based in part on the determined location in the virtual model and any acoustic parameters associated with the determined location. In some embodiments, some of the components of the mapping server 570 may be integrated with another device (e.g., the console 510) connected to NED 505 via a wired connection.

The network 575 connects the NED 505 to the mapping server 570. The network 575 may include any combination of local area and/or wide area networks using both wireless and/or wired communication systems. For example, the network 575 may include the Internet, as well as mobile telephone networks. In one embodiment, the network 575 uses standard communications technologies and/or protocols. Hence, the network 575 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 575 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 575 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 575 may also connect multiple headsets located in the same or different rooms to the same mapping server 570. The use of mapping servers and networks to provide audio and visual content is described in further detail in U.S. patent application Ser. No. 16/366,484 filed on Mar. 27, 2019, incorporated herein by reference in its entirety.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, in relation to manufacturing processes. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described (e.g., in relation to manufacturing processes).

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   obtaining, by a headset including a display and a plurality of speakers, video content for display on the headset, the video content including audio content for output by the plurality of speakers;
   determining, by the headset, a correspondence between the video content and the audio content using correspondence analysis by:
      identifying a first set of pixels within the video content associated with changes in pixel values over a first set of frames of the video content;
      identifying, from the audio content, first audio associated with the first set of frames of the video content that correspond to the changes in pixel values of the first set of pixels; and
      generating a user contributable correspondence map that maps different audio from the audio content to pixels within the video content, the user contributable correspondence map including a mapping between the first audio over the first set of frames and the first set of pixels;
   displaying, by the display of the headset, the first set of frames of the video content on the display of the headset; and
   outputting the first audio on a first speaker and a second speaker from the plurality of speakers while the first set of frames of the video content are displayed, wherein sound of the first audio output on the first speaker is different from sound of the first audio output on the second speaker based on the user contributable correspondence map, the first speaker and the second speaker located on opposing sides of the headset.

2. The method of claim 1, wherein determining the correspondence between the video content and the audio content further comprises:
   identifying a second set of pixels within the video content associated with changes in pixel values over a second set of frames of the video content;
   identifying, from the audio content, second audio associated with the second set of frames of the video content that correspond to the changes in pixel values of the second set of pixels; and
   modifying the user contributable correspondence map to include a mapping between the second audio over the second set of frames and the second set of pixels.

3. The method of claim 2, further comprising:
   determining, using semantic segmentation, a first object and a second object in the video content;
   identifying the first set of pixels as a subset of the first object, wherein generating the user contributable correspondence map includes mapping the first audio to the first object in the video content in the user contributable correspondence map; and
   identifying the second set of pixels as a subset of the second object, wherein modifying the user contributable correspondence map includes mapping the second audio to the second object in the video content in the user contributable correspondence map.

4. The method of claim 1, further comprising:
   identifying, using audio beamforming, a subset of the first set of frames of the video content associated with the first audio, wherein the first set of pixels are within the first set of frames, and wherein the correspondence analysis is determined using the subset of the first set of frames for the first set of frames.

5. The method of claim 4, wherein the audio beamforming is performed by a plurality of spatially separated microphones.

6. The method of claim 1, wherein the changes in pixel values comprise changes in at least one of a luminance or one or more colors of the first set of pixels.

7. The method of claim 1, wherein the video content is spherical, panoramic, or ego-centric when obtained.

8. A headset comprising:
a display configured to display video content that includes audio content;
an audio system including a plurality of speakers configured to output the audio content, the plurality of speakers including a first speaker and a second speaker that are located on opposing sides of the headset; and
a controller configured to determine, using a correspondence analysis, a correspondence between the video content and the audio content, wherein the controller is configured to:
identify a first set of pixels within the video content associated with changes in pixel values over a first set of frames of the video content;
identify, from the audio content, first audio associated with the first set of frames of the video content that correspond to the changes in pixel values of the first set of pixels; and
generate a user contributable correspondence map that maps different audio from the audio content to pixels within the video content, the user contributable correspondence map including a mapping between the first audio over the first set of frames to the first set of pixels,
wherein the display is configured to display the first set of frames of the video content and the first speaker and the second speaker are configured to output the first audio while the first set of frames are displayed on the display based on the user contributable correspondence map, but sound of the first audio output on the first speaker is different from sound of the first audio output on the second speaker based on the user contributable correspondence map.

9. The system of claim 8, wherein the controller is further configured to:
identify a second set of pixels within the video content associated with changes in pixel values over a second set of frames of the video content;
identify, from the audio content, second audio associated with the second set of frames of the video content that correspond to the changes in pixel values of the second set of pixels; and
modify the user contributable correspondence map to include a mapping between the second audio over the second set of frames and the second set of pixels.

10. The system of claim 9, wherein the controller is further configured to:
determine, using semantic segmentation, a first object and a second object in the video content;
identify the first set of pixels as a subset of the first object, wherein generating the user contributable correspondence map includes mapping the first audio to the first object in the video content in the user contributable correspondence map; and
identify the second set of pixels as a subset of the second object, wherein modifying the user contributable correspondence map includes mapping the second audio to the second object in the video content in the user contributable correspondence map.

11. The system of claim 8, wherein the controller is further configured to:
identify, using audio beamforming, a subset of the first set of frames of the video content associated with the first audio, wherein the first set of pixels are within the first set of frames, and wherein the correspondence analysis is determined using the subset of the first set of frames for the first set of frames.

12. The system of claim 11, wherein the audio beamforming is performed by a plurality of spatially separated microphones, the audio system comprising the spatially separated microphones.

13. The system of claim 8, wherein the changes in pixel values comprise changes in at least one of a luminance or one or more colors of the first set of pixels.

14. The system of claim 8, wherein the video content is spherical, panoramic, or ego-centric when obtained.

15. A non-transitory computer readable storage medium comprising computer executable code that when executed by one or more processors cause the one or more processors to perform operations comprising:
obtaining, by a headset including a display and a plurality of speakers, video content for display on the headset, the video content including audio content for output by the plurality of speakers;
determining, by the headset, a correspondence between the video content and the audio content using correspondence analysis by:
identifying a first set of pixels within the video content associated with changes in pixel values over a first set of frames of the video content;
identifying, from the audio content, first audio associated with the first set of frames of the video content that correspond to the changes in pixel values of the first set of pixels; and
generating a user contributable correspondence map that maps different audio from the audio content to pixels within the video content, the user contributable correspondence map including a mapping between the first audio over the first set of frames and the first set of pixels;
displaying, by the display of the headset, the first set of frames of the video content on the display of the headset; and
outputting the first audio on a first speaker and a second speaker from the plurality of speakers while the first set of frames of the video content are displayed, wherein sound of the first audio output on the first speaker is different from sound of the first audio output on the second speaker based on the user contributable correspondence map, the first speaker and the second speaker located on opposing sides of the headset.

16. The computer readable storage medium of claim 15, the operations further comprising:
identifying a second set of pixels within the video content associated with changes in pixel values over a second set of frames of the video content;
identifying, from the audio content, second audio associated with the second set of frames of the video content that correspond to the changes in pixel values of the second set of pixels; and
modifying the user contributable correspondence map to include a mapping between the second audio over the second set of frames and the second set of pixels.

17. The computer readable storage medium of claim 16, the operations further comprising:
- determining, using semantic segmentation, a first object and a second object in the video content;
- identifying the first set of pixels as a subset of the first object, wherein generating the user contributable correspondence map includes mapping the first audio to the first object in the video content in the user contributable correspondence map; and
- identifying the second set of pixels as a subset of the second object, wherein modifying the user contributable correspondence map includes mapping the second audio to the second object in the video content in the user contributable correspondence map.

18. The computer readable storage medium of claim 15, the operations further comprising:
- identifying, using audio beamforming, a subset of the first set of frames of the video content associated with the first audio, wherein the first set of pixels are within the first set of frames, and wherein the correspondence analysis is determined using the subset of the first set of frames for the first set of frames.

19. The computer readable storage medium of claim 18, wherein the audio beamforming is performed by a plurality of spatially separated microphones.

20. The computer readable storage medium of claim 15, wherein the changes in pixel values comprise changes in at least one of a luminance or one or more colors of the first set of pixels.

* * * * *